Patented Sept. 22, 1925.

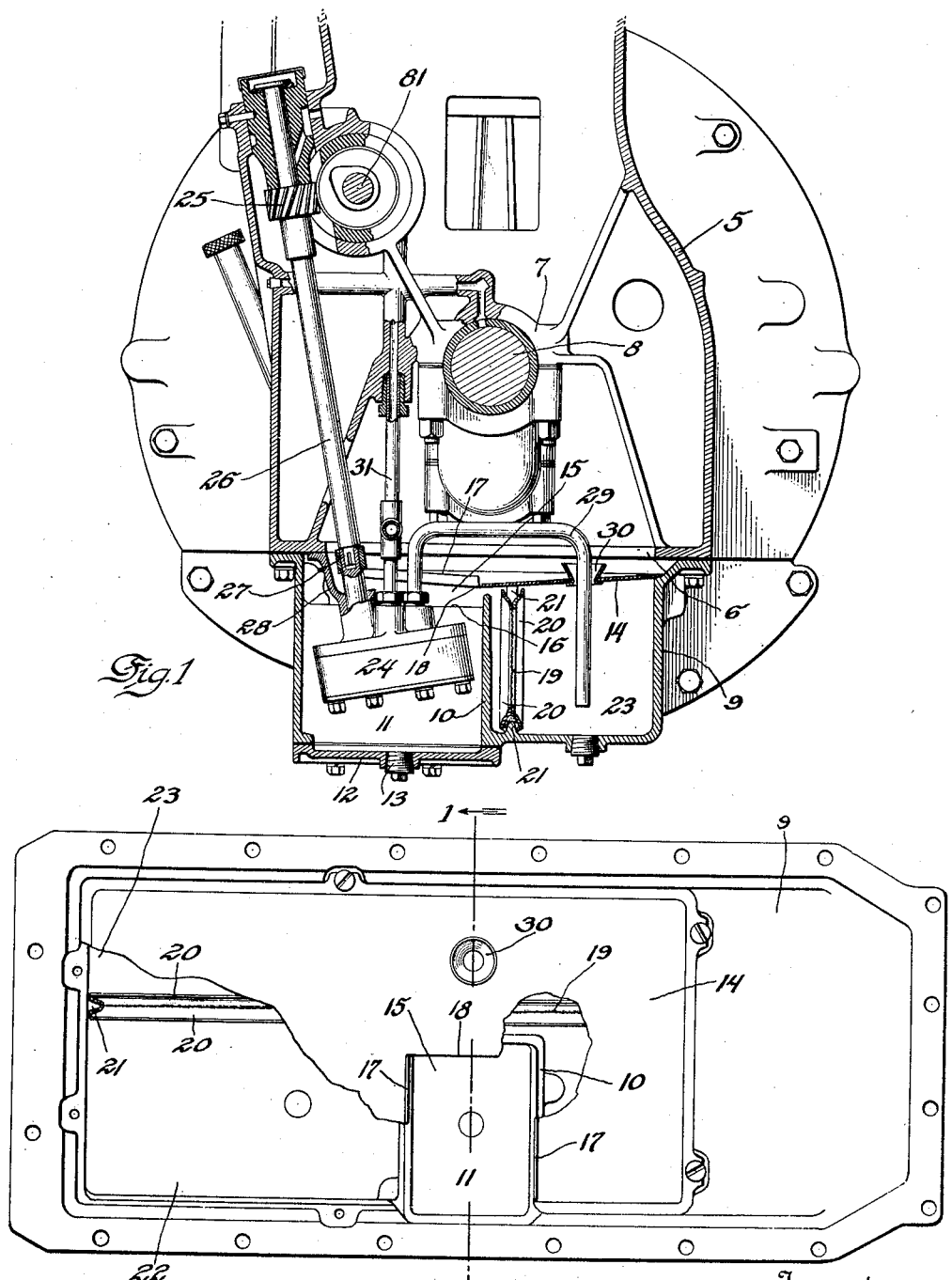

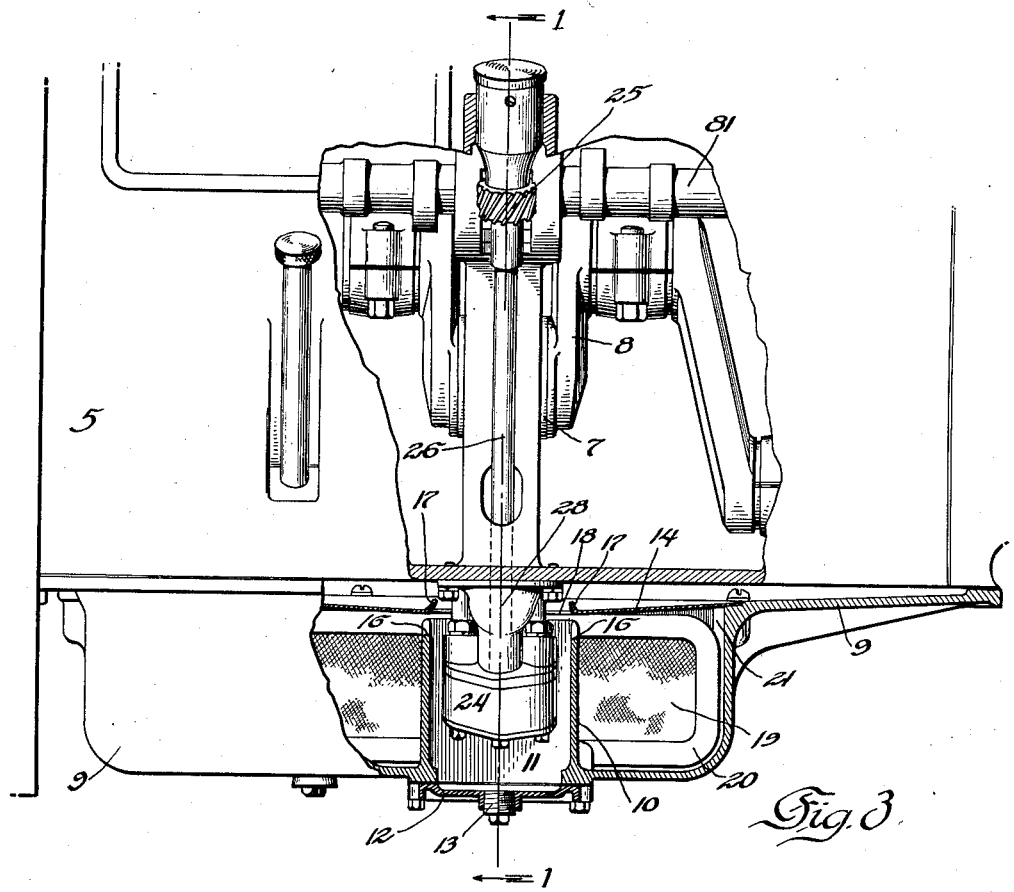
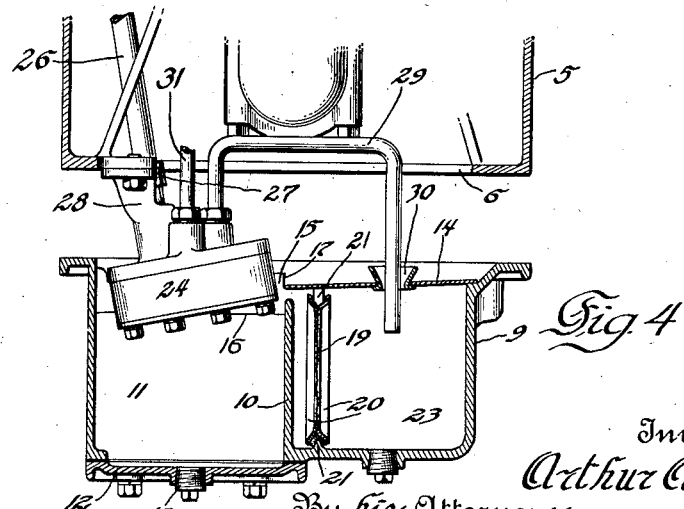

1,554,329

UNITED STATES PATENT OFFICE.

ARTHUR A. BULL, OF DETROIT, MICHIGAN, ASSIGNOR TO GENERAL MOTORS CORPORATION, OF DETROIT, MICHIGAN, A CORPORATION OF DELAWARE.

LUBRICATING SYSTEM FOR INTERNAL-COMBUSTION ENGINES.

Application filed October 24, 1921. Serial No. 510,012.

*To all whom it may concern:*

Be it known that I, ARTHUR A. BULL, a citizen of the United States of America, and a resident of Detroit, county of Wayne, and State of Michigan, have invented certain new and useful Improvements in Lubricating Systems for Internal-Combustion Engines, of which the following is a full, clear, concise, and exact description, such as will enable others skilled in the art to which the invention relates to make and use the same, reference being made therein to the accompanying drawings, which form a part of this specification.

My invention relates to lubricating systems for use in conection with internal combustion engines, altho the same is also capable of use in engines of other types such as steam engines, in compressors, and similar devices; and particularly to lubricating systems of the general type or class wherein the lubricant is supplied under pressure to the bearings to be lubricated by means of a suitable pump operated by the engine, and which forces the oil whereby the parts are lubricated to the various bearings to be lubricated.

In force feed lubricating systems of the type above referred to the principal bearings to be lubricated are those of the crank and cam shafts which are located within a suitable crank case which is open at its lower end, and the said open bottom is closed by a removable oil pan which forms an oil receptacle from which the oil is pumped to the bearings and to which the oil returns after lubricating the parts; and my invention broadly considered consists in various improvements in and relating to the said oil receptacle, and to the relation of the pump and other parts of the lubricating system relative thereto and to the engine.

One object of my invention is to provide a lubricating system of the general type above refered to wherein the oil pump is located within a separate chamber partitioned off from the interior of the oil receptacle or oil pan; the pump chamber being thus isolated from the main portion of the interior of the oil receptacle from which the oil is pumped, and to which the same returns from the crank case after accomplishing the lubrication of the parts to be lubricated.

Another object of my invention is to provide an improved lubricating system of the class described wherein the chamber wherein the oil pump is located is isolated from the rest of the interior of the oil receptacle, and is provided with means for draining the oil from the said chamber without draining oil from the main interior portion of the oil receptacle; the said chamber forming a settling basin in which impurities of the oil accummulate and from which a comparatively small quantity of impure oil may be drained without wasting the main body of oil contained within the oil receptacle.

A further object of my invention is to provide an improved force feed lubricating system in which the underside of the pump containing chamber is removable, so that the pump itself may be removed downward independently of the rest of the lubricating system, and without removing the oil containing receptacle from the crank case of the engine.

A further object of my invention is to provide various improvements in and relating to lubricating systems of the type referred to and wherein a screen or filter is provided for filtering the oil after it has returned from the crank case to the settling basin, and before it is returned by the pump to the bearings to be lubricated.

A further object of my invention is to provide an improved lubricating system for internal combustion and other engines wherein the oil is kept cleaner during the operation of the system than has heretofore commonly been the case; such end being accomplished by providing an independent settling chamber within which the pump is located, and from which small quantities of contaminated oil may be moved from time to time without wasting the entire body of oil involved in the lubricating function; and in which additional means are provided for filtering the oil after such impurities as will settle out therefrom by gravity have been caught and isolated in the pump containing chamber included in the system and before it returns to the pump and to the bearings to be lubricated.

A further object of my invention is to provide certain improvements in and relating to various elements and features of force feed lubricating systems of the general type or class above referred to.

With the above and other objects of invention in view, my invention consists in the improved force feed lubricating system and subordinate parts and auxiliary features thereof illustrated in the accompanying drawings and hereinafter described and claimed; and in such variations and modifications thereof, within the scope of the concluding claims, as will be obvious to those skilled in the art to which my invention relates.

Referring now to the drawings accompanying and forming a part of this specification, and wherein the preferred embodiment of my invention is illustrated:

Figure 1 is a fragmentary sectional view showing the crank case and crank and cam shafts of an internal combustion engine, the same being equipped with a lubricating system made in accordance with my invention; the section being taken upon a vertical transverse plane the position of which is indicated, approximately, by the line 1, 1, in Figures 2 and 3.

Figure 2 is a view showing the oil pan or oil receptacle by itself and in plan, and removed from the crank case.

Figure 3 is a view showing the crank case of the engine, as in Figure 1, partly in side elevation and partly broken away to show various features of construction of the lubricating system otherwise hidden by the external wall of the crank case.

Figure 4 is a fragmentary view illustrating various features of construction and operation of my improved lubricating system.

In the drawings, the reference numeral 5 designates the crank case of an internal combustion or other engine, the same being open at 6 along its under side; said crank case having suitable bearings 7 located within the same and commonly up above the lower open end thereof and within which bearings the crank shaft 8 of the engine is rotatably supported. The crank case is also provided with bearings for supporting the cam shaft 81 of the engine; these shafts being elements commonly present in engines of the type illustrated and the bearings of which shafts are shown as lubricated by my improved force feed lubricating system.

The reference numeral 9 designates an oil pan or oil receptacle which is secured to the lower end of the crank case and acts to close the opening therein; said pan being hollow so that it forms a container into which the oil flows downward from the crank case after it has acted to lubricate the bearings to be lubricated, and within which a considerable volume of oil is contained when the engine is in operation.

The oil receptacle is provided with a partition 10 whereby a comparatively small portion of the interior thereof is divided off to thereby provide a pump containing chamber 11 which is isolated from the main interior portion of the receptacle. This pump chamber is open at its lower end and is provided with a removable cover 12, so that upon removing said cover access may be had to the interior of the chamber from the underside thereof. The pump chamber is also provided with means whereby the oil therein may be drained therefrom without removing the cover, and without withdrawing the main body of oil from within the oil receptacle 9, such, for example, as is provided by the removable plug 13; so that upon removing the plug such contaminated oil as may have accummulated within the pump containing chamber may be drained away, while access may be had to the interior of the chamber by removing the cover plate 12.

The open upper side of the oil receptacle is closed by a cover or plate 14 which is shown as dished and inclined toward the pump containing compartment 11 so that such oil as falls downward from the various bearings and other parts within the crank case onto said plate will be guided towards its middle portion and will flow through an opening therein and back into the interior of the oil receptacle. As shown, this plate is provided with an opening at 15 which is located directly above the pump containing chamber 11 so that the oil returned from the crank case flows first directly into the said chamber and, after accumulating therein to such an extent as to overflow the side walls at 16 of said chamber, flows over said side walls and into the main interior space of said oil receptacle; such interior space comprising, as will be appreciated, the entire interior of the oil receptacle except the portion which is divided off and isolated by the partition 10 to form the pump chamber 11.

The plate 14 is preferably provided with upwardly extending flanges extending along two edges of the opening 15 therein as shown at 17, 17; so that the returning oil is caused to flow into the pump chamber 11 along one edge 18 of the opening, but is prevented from flowing into the said chamber along the other edge by the said flanges.

Located within the oil receptacle is a filter or screen 19 the periphery of which is held in a suitable frame shown as made up of two frame members 20, 20 so shaped as to provide an external groove extending about the frame and screen and which screen and frame are held in place within the receptacle by an internal ridge 21 extending along the bottom and up the end walls of the oil receptacle and which lies within the groove when the screen is in place; the upper end of the screen and frame lying close to the plate 14, as shown.

The screen divides the main interior portion of the oil receptacle into an unfiltered oil compartment 22 and a filtered oil compartment 23; the oil returned from the crank case to the pump chamber 11 passing directly into the unfiltered oil compartment 22 as it overflows the upper edge of the partition 10 whereby said chamber is provided, and then from said unfiltered oil compartment through the screen 19 and into the filtered oil compartment 23.

The reference numeral 24 designates the pump whereby oil is forced to the various bearings to be lubricated, said pump being of any of the ordinary and conventional forms of rotary pump commonly employed in lubricating systems. This pump is shown as driven from the cam shaft 81 of the engine through suitable gearing at 25 and through a pump operating shaft 26, which is operatively connected with the rotating element of the pump; the driving force being preferably transmitted through a coupling 27 of such form as to positively drive the pump, while at the same time permitting the same to be disconnected from the shaft 26 by longitudinal or downward movement of the pump relative to the shaft. The casing of the pump is provided with an upwardly extending bracket 28 whereby the pump is supported within the chamber 11 and the upper end of which bracket is secured to the underside of the crank case; so that the support for the pump as a whole is from the crank case, and not from the oil pan or receptacle.

The pump draws its supply of oil from the filtered oil compartment 23 through an inlet conduit 29 which extends upwardly from the pump, and then laterally and down through a hole 30 provided in the plate 14 and into the said compartment; while the discharge conduit 31 through which oil flows from the pump passes upward and into the crank case, and to the various bearings of the engine to be lubricated; the conduit being suitably branched and divided and arranged so as to supply oil to the various bearings to be lubricated.

In view of the premises it will be seen that the oil after having lubricated the various bearings to which it is supplied passes downward within the crank case and onto the plate 14, and is deflected and guided by said plate into the open upper end of the chamber 11 within which the pump 24 is located. The oil when it reaches this chamber is obviously in its most contaminated condition; and such solid material, water, and other impurities as are carried by the oil settle out therefrom within this chamber, and are retained therein. When the pump chamber becomes full the oil from which the greater part of the entrained impurities have settled out by gravity overflows the upper end of the partition 10 and passes into the unfiltered oil compartment 22, and from this compartment through the screen 19 which acts to filter out such impurities as may not have separated from the oil by gravity and been retained in the chamber 11, and into the filtered oil compartment 23.

The pump therefore derives its supply of oil from a compartment of the oil receptacle, that is from the filtered oil compartment 23, in which the oil is in as clean a condition as possible; the same having been subjected to a double purifying operation whereby such impurities as are present therein are separated first by gravity, and thereafter by the filtering action of the screen 19.

It will be further appreciated that such impurities as remain in the pump containing chamber 11 may be drained therefrom without wasting the comparatively large quantity of oil within the oil receptacle, and without withdrawing the same from the interior thereof, as the partition 10 acts always to prevent the flow of oil from the interior of the said receptacle into the pump chamber.

The draining of the impure oil from the chamber 11 may obviously be accomplished by simply removing the plug 13; and access may be had to the interior of the pump containing chamber and the pump itself inspected, adjusted or repaired by removing the removable cover plate 12.

The pump in its entirety may obviously be removed through the lower open end of the pump chamber after the cover plate has been removed by removing the cap screws whereby the bracket 28 is secured to the underside of the crank case, and loosening the connections between the pump and its supply and discharge conduits, altho as a matter of course more complete access may be gained to the pump by removing the entire oil receptacle, as indicated in Figure 4 of the drawing.

Having thus described and explained my invention, I claim and desire to secure by Letters Patent:

1. In a lubricating system for engines and in combination with a crank case having an open underside, an oil receptacle for closing the open under side of said crank case and which receptacle is provided with a partition whereby a pump containing chamber is formed and which chamber is in open communication at its upper end with the interior of said oil receptacle, and is provided with an opening leading to the outside thereof; a removable cover for closing said opening; a plate overlying said oil receptacle and having an opening through which oil from the crank case returns to said oil receptacle; a pump located within said pump chamber; a supply conduit leading from said oil receptacle to said pump; a discharge conduit leading from said pump to an engine bearing to be lubricated; and means for driving said pump from the engine.

2. In a lubricating system for engines and in combination with a crank case having and open under side, an oil receptacle for closing the open under side of said crank case and which receptacle is provided with a partition whereby a pump containing chamber is formed, and which chamber is in open communication with the interior of said oil receptacle at its upper end; means whereby oil may be drained from said chamber without draining oil from said oil receptacle; a plate overlying said oil receptacle and having an opening leading into and through which oil from the crank case flows into said pump containing chamber; a pump located within said chamber; a supply conduit leading from said oil receptacle to said pump; a discharge conduit leading from said pump to an engine bearing to be lubricated; and means for driving said pump from the engine.

3. In a lubricating system for engines and in combination with a crank case having an open under side, an oil receptacle for closing the open under side of said crank case and which receptacle is provided with a partition whereby a pump containing chamber is formed and which chamber is in open communication at its upper end with the interior of said oil receptacle, and is provided with an opening leading to the exterior thereof; a removable cover for closing said opening; a plate overlying said oil receptacle and having an opening leading into said pump containing chamber and through which oil from the crank case flows into said pump containing chamber; a pump located within said chamber; a supply conduit leading from said oil receptacle to said pump; a discharge conduit leading from said pump to an engine bearing to be lubricated; and means for driving said pump from the engine.

4. In a lubricating system for engines and in combination with a crank case having an open under side, an oil receptacle for closing the open under side of said crank case; a filtering screen located within and whereby the interior of said oil receptacle is divided into compartments for filtered and for unfiltered oil; a partition associated with said oil receptacle and whereby a pump containing chamber is formed and which chamber is in open communication with the interior of said oil receptacle at its upper end, and is provided with an opening at its lower end; a removable cover for closing said opening; a plate overlying said oil receptacle and having an opening through which oil from the crank case returns to the unfiltered oil compartment aforesaid; a pump located within said pump chamber; a supply conduit leading from said filtered oil compartment to said pump; a discharge conduit leading from said pump to an engine bearing to be lubricated; and means for driving said pump from the engine.

5. In a lubricating system for engines and in combination with a crank case having an open under side, an oil receptacle for closing the open under side of said crank case; a filtering screen located within and whereby the interior of said oil receptacle is divided into compartments for filtered and for unfiltered oil; a partition associated with said oil receptacle and whereby a pump containing chamber is provided within said unfiltered oil compartment, and which chamber is in open communication at its upper end with the interior of said compartment; means whereby oil may be drained from said pump chamber without draining oil from said unfiltered oil compartment; a plate overlying said oil receptacle and having an opening leading into said pump containing chamber and through which oil from the crank case flows into said pump containing chamber; a pump located within said chamber; a supply conduit leading from said filtered oil compartment to said pump; a discharge conduit leading from said pump to an engine bearing to be lubricated; and means for driving said pump from the engine.

6. In a lubricating system for engines and in combination with a crank case having an open under side, an oil receptacle for closing the open under side of said crank case; a filtering screen located within and whereby the interior of said oil receptacle is divided into compartments for filtered and for unfiltered oil; a partition associated with said oil receptacle and whereby a pump containing chamber is provided within said unfiltered oil compartment and which chamber is in open communication with the interior of said compartment at its upper end, and is provided with an opening at its lower end; a removable cover for closing said opening; a plate overlying said oil receptacle and having an opening leading into said pump containing chamber and through which oil from the crank case flows into said pump containing chamber; a pump located within said chamber; a supply conduit leading from said filterated oil compartment to said pump; a discharge conduit leading from said pump to an engine bearing to be lubricated; and means for driving said pump from the engine.

7. In a lubricating system for engines and in combination with a crank case having an open under side, an oil receptacle for closing the open under side of said crank case and which receptacle is provided with a pump containing chamber isolated from the interior thereof and so arranged that oil may be withdrawn from said pump chamber without withdrawing such other oil as may be contained within said receptacle; means for returning oil from the interior of the crank case into said chamber; means whereby oil may be drained from said chamber without draining oil from said receptacle; a pump located within said pump chamber; a supply conduit leading from said oil receptacle to said pump; a discharge conduit leading from said pump to a bearing to be lubricated; and means for driving said pump from the engine.

8. In a lubricating system for engines and in combination with a crank case having an open under side, an oil receptacle for closing the open under side of said crank case and which receptacle is provided with a pump containing chamber isolated from the interior thereof and so arranged that oil may be withdrawn from said pump chamber without withdrawing such other oil as may be contained within said receptacle, and which pump containing chamber is provided with an opening through which access thereinto may be had from the exterior thereof; a removable cover for closing said opening; a pump located within said pump chamber; a supply conduit leading from said oil receptacle to said pump; a discharge conduit leading from said pump to a bearing to be lubricated; and means for driving said pump from the engine.

9. In a lubricating system for engines and in combination with a crank case having an open under side, an oil receptacle for closing the open under side of said crank case and which receptacle is provided with a pump containing chamber isolated from the interior thereof and so arranged that oil may be withdrawn from said pump chamber without withdrawing such other oil as may be retained within said receptacle; a pump supported from the crank case of the engine and located within said pump chamber; a supply conduit leading from said oil receptacle to said pump; a discharge conduit leading from said pump to a bearing to be lubricated; and means for driving said pump from the engine.

10. In a lubricating system for engines and in combination with a crank case having an open under side, an oil receptacle for closing the open under side of said crank case and which receptacle is provided with a pump containing chamber isolated from the interior thereof; a pump supported from the crank case of the engine and located within said pump chamber; a supply conduit leading from said oil receptacle to said pump; a discharge conduit leading from said pump to a bearing to be lubricated; means for returning oil from the interior of the crank case into said pump chamber; means whereby oil may be drained from said chamber without draining oil from said receptacle; and means for driving said pump from the engine.

11. In a lubricating system for engines and in combination with a crank case having an open under side, an oil receptacle for closing the open under side of said crank case and which receptacle is provided with a pump containing chamber isolated from the interior thereof and so arranged that oil may be withdrawn from said pump chamber without withdrawing such other oil as may be retained within said receptacle; a pump supported from the crank case of the engine and located within said pump chamber; a supply conduit leading from said oil receptacle to said pump; a discharge conduit leading from said pump to a bearing to be lubricated; a removable cover for closing and opening provided in said pump containing chamber and leading to the exterior therof; and means for driving said pump from the engine.

12. In a lubricating system for engines and in combination with a crank case having an open under side, an oil receptacle for closing the open under side of said crank case and having a settling chamber provided by a vertically arranged partition disposed within said receptacle; means for directing oil flowing from said crank case into said settling chamber; a screen in said oil receptacle so arranged as to divide the interior therof into a filtered oil compartment and an unfiltered oil compartment, the arrangement of the parts being such as to permit the flow of oil from the settling chamber aforesaid over the upper edge of said partition and to the unfiltered oil compartment, and therefrom into said filtered oil compartment; a pump so arranged as to draw oil from said filtered oil compartment and force the same to a bearing to be lubricated; and means whereby contaminated oil may be withdrawn from said settling chamber without withdrawing such other oil as may be contained within said receptacle.

In testimony whereof I affix my signature.

ARTHUR A. BULL.